July 12, 1966 J. C. MARTIN 3,260,883

SWITCH FOR FAST ELECTRICAL DISCHARGE HAVING A PLURALITY OF ELECTRODES WITH A NON-POROUS DIELECTRIC MATERIAL INSERTED BETWEEN THE ELECTRODES

Filed Jan. 7, 1963 5 Sheets-Sheet 1

United States Patent Office 3,260,883

Patented July 12, 1966

3,260,883

SWITCH FOR FAST ELECTRICAL DISCHARGE HAVING A PLURALITY OF ELECTRODES WITH A NON-POROUS DIELECTRIC MATERIAL INSERTED BETWEEN THE ELECTRODES

John Christopher Martin, Tadley, England, assignor to United Kingdom Atomic Energy Authority, London, England Filed Jan. 7, 1963, Ser. No. 249,853
Claims priority, application Great Britain, Jan. 9, 1962, 799/62
3 Claims. (Cl. 313—268)

This invention relates to switches for handling electrical pulses, and it has its prime application in the discharge of electrical pulse generators.

Switches incorporating the invention have reproducible characteristics. They can, by suitable dimensioning, be used to handle very large voltages and currents. The uncertainty in their time of operation (known as jitter) can be kept very small and this enables heavy power pulses to be generated by discharging in series a plurality of pulse generators.

Pulse generators of the type employing strip transmission lines can be designed so that the switch is effectively buried in a line and the line can therefore be discharged with only very small losses due to radiation and this results in much less electrical interference with the equipment in the vicinity of the pulse generator.

The rise time of electrical pulses is governed by the performance of the pulse generator itself, the load, and the switch. It has become apparent that, in pulse generators incorporating switches of the prior art, the pulse generator has in some instances been prevented by the switch from giving its full theoretical performance. By the use of the switch of the invention the limiting effect of the switch can be reduced.

The invention comprises a switch, for establishing a conducting path between a positive electrode and a negative electrode, which comprises a non-porous dielectric material adapted to be inserted between the said positive and negative electrodes, the said material being provided with a channel which extends in a direction from one electrode in the direction of the other and terminates at a predetermined point within the said material, the shape of the channel at the said point being adapted to increase electrical stress thereat when electrical stress is applied to the said material and produce electrical breakdown of the said material.

The use of a non porous dielectric material as an electrical insulator is of course well known. In the past, the study of the properties of such materials has been directed, among other things, to the study of their breakdown under applied electrical fields. The studies showed that the mechanism of breakdown under applied fields is complex and was unpredictable with respect to the precise voltage at which breakdown would occur and the precise time at which a conducting path would be established in the material. Attempts have been made in the past to produce switches which operated by the breakdown of a solid dielectric insulator by the action of an externally generated explosion which disintegrated and ionised the solid material, but such switches were costly and elaborate, and furthermore their accuracy in time was limited by the performance characteristics of the explosive device.

In the switches of the invention the breakdown is achieved by electrical means and this breakdown can be accurately controlled in time.

In a particularly preferred switch the positive and negative electrodes are separated by an intermediate electrode. This switch can operate in two ways. In the first way the total voltage across the pair of dielectrics is above the breakdown voltage for a single dielectric layer, and the intermediate electrode is held at an intermediate voltage. Shorting of the intermediate voltage to earth causes one of the dielectric layers to be subjected to the total applied voltage and therefore causes breakdown. The breakdown of this layer subjects the second layer to an overvoltage and causes it to breakdown. A number of switches can be operated with good simultaneity by the use of a common intermediate electrode. A fairly slowly falling voltage on the intermediate electrode can give a simultaneity in the region $10^{-8}$ secs.

In the second way of operating the switch, a pulse is applied to the intermediate electrode to produce overvolts. Simultaneity within $10^{-9}$ sec. can be achieved if the pulse has a $dV/dt$ greater than $10^{12}$ v./sec. The main discharge through the non-porous dielectric produces a puncture and necessitates replacement of the non-porous dielectric after each discharge.

The channel may be constituted in a variety of ways. It may, for example, be constituted by a metallic conductor extending into the dielectric. A small ball bearing pressed into a plastic sheet is one example. Another example is a thin metal wire inserted into the solid dielectric.

In a preferred form of the invention the channel is constituted by a small-diameter blind hole extending into the material. If, for example, the non porous dielectric is a soft plastic material, e.g. polyethylene, the discontinuity can be produced by pressing a pin part way into the material and then removing it.

It has been observed that there is a polarity effect on the performance of the switch. Thus when a sheet of polyethylene was pierced part way from one side only, the breakdown voltage was much higher if the surface from which the channel extended was submitted to a negative potential than if it was submitted to a positive potential.

It is important that the dielectric material should not contain random imperfections which would lead to the premature breakdown of the material. Since most industrial products do, however, contain imperfections it is necessary to take all possible steps to reduce their effect. The preferred step is to keep the area of highly stressed dielectric material as small as possible so that there is a minimum statistical probability of a defect being present in the high field region.

With the three element switches, that is, with the switches using two layers of dielectric, the dielectric switch must be able to withstand half the total voltage ($V/2$) and must breakdown at the total applied voltage (v.). For high speed operation it is advisable that the dielectric should breakdown at 0.75 v. It has been noticed that, for pulses rising in about 1 micro-sec., there is a standard deviation of $\pm 2\%$ in the voltage causing breakdown of the dielectric switch.

The standard deviation can be reduced by providing a number of channels in the non-porous dielectric in the high stress region. Breakdown will occur at the discontinuity at which the field first reaches the dielectric strength. A channel having a slightly rough tip will breakdown before a channel having a smooth tip.

One practical method for providing channels in soft plastic dielectrics is to stab the material with a board on which are evenly mounted about 50 pins.

In operation of a particular switch using a polyethylene sheet 0.06" thick and containing 50 channels of depth 0.010" with pointed tips of radius 0.001", after a formative time of less than $10^{-10}$ secs., the non-porous dielectric becomes conducting through a rather zig-zag path, which rapidly straightens out. During the first nanosecond ($10^{-9}$ sec.) the impedance may be higher than either the inductance or rate of change of inductance can provide. After this, however, rates of current rise of $5 \times 10^{13}$ amp/sec., and an inductance of $3 \times 10^{-9}$ henry can be obtained. Such a switch can be used for a working voltage range of 20 kv. to 300 kv. In general, higher working voltages can be obtained by increasing the thickness of the sheet, or by increasing the radius of the pointed tip of the discontinuity. If needles of greater tip radius are used to provide the discontinuity, it is advisable to heat the needles to avoid tearing.

If the overvolting pulses has a $dV/dt$ above $10^{11}$ v./sec. it has been found that more than one discontinuity breaks down to give rise to a current carrying channel. If the $dV/dt$ is above $10^{12}$ v./sec. all the fifty discontinuities break down.

Ten such switches connected in parallel have been fired with a standard deviation of about 1 nanosecond.

It has been found that there appears to be an upper limit to the current which any material can carry per unit cross-sectional area. A single channel in the above switch can carry up to 250,000 amps but no more. An increase in the number of channels which break down therefore raises the maximum current which the switch can carry.

In addition to this the inductance of the switch is also reduced.

Examples of the invention are illustrated in the accompanying drawings in which

Figure 4:
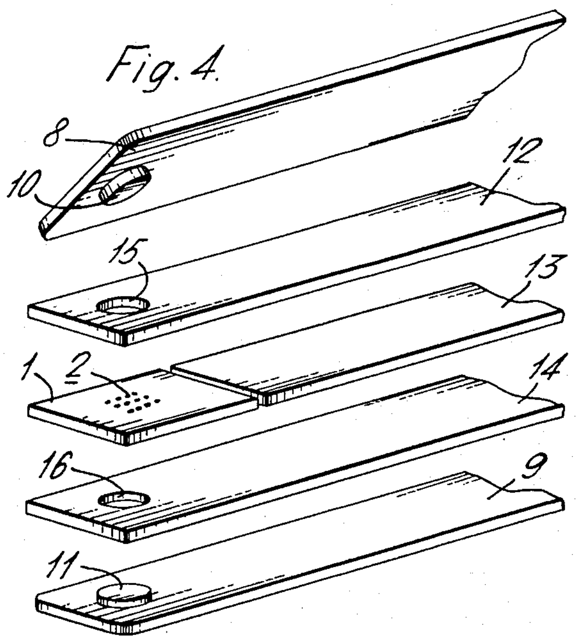
Figure 5:
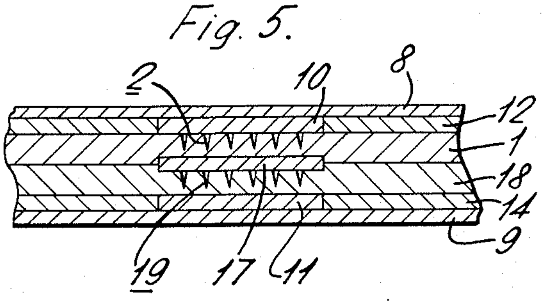
Figure 6:
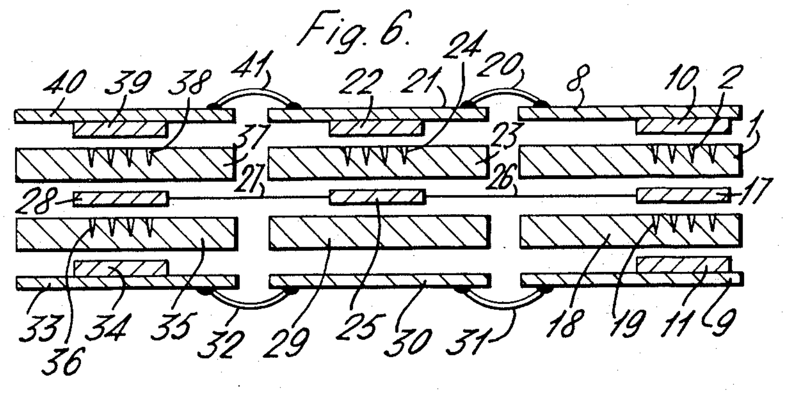
Figure 7:
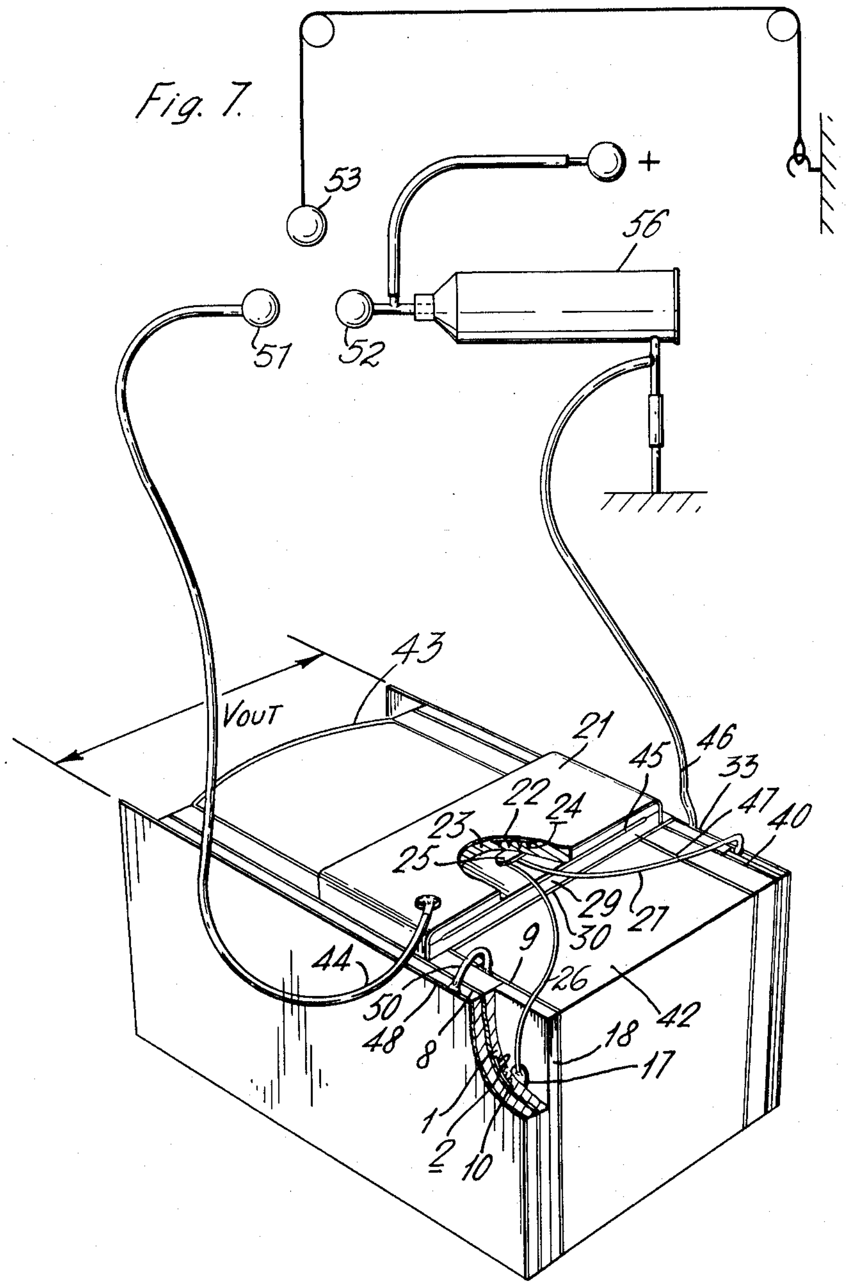
Figure 8:
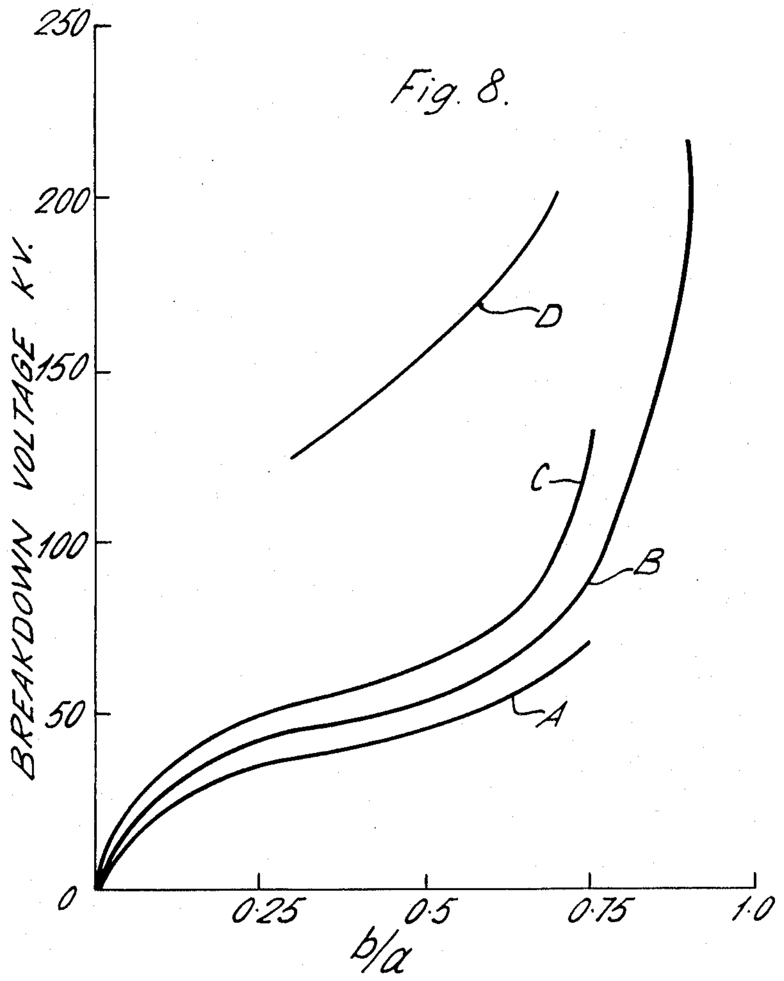
Figure 11:
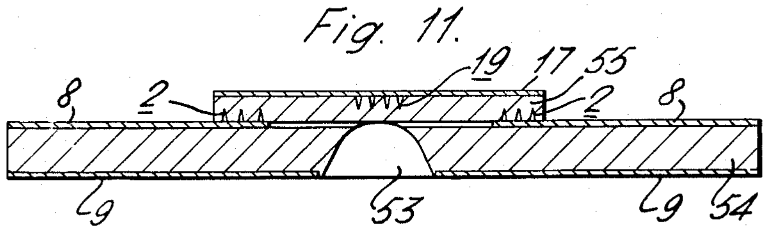
Figure 9:
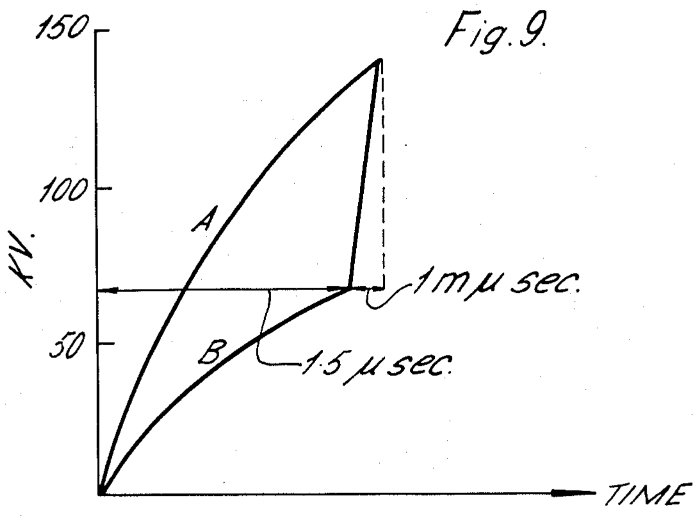
Figure 10:
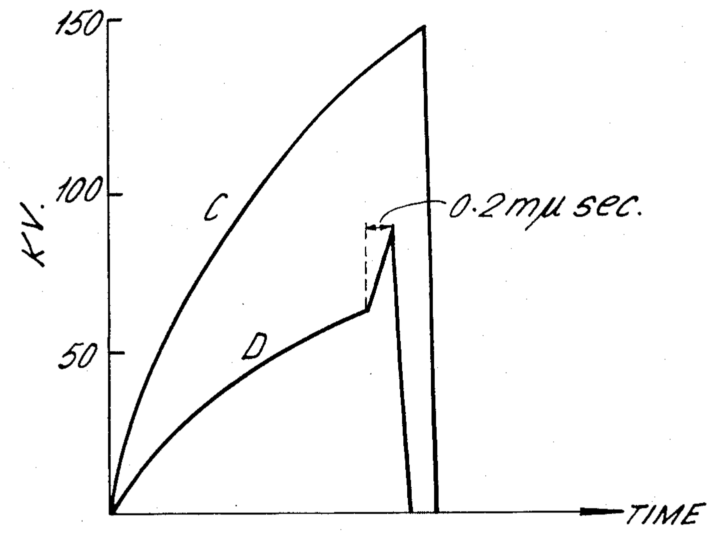

FIGURE 4 is an exploded diagram showing the relative positioning of conductors and insulator forming a strip transmission line adapted to be discharged by the switch of the invention, FIGURE 5 is a diagrammatic section of a three electrode switch in which a trigger pulse is applied to the intermediate electrode to operate the switch, FIGURE 6 is a diagrammatic section of two three electrode switches and a trigger switch, FIGURE 7 is a perspective illustration of a pulse generator incorporating two three electrode switches and a trigger switch, FIGURE 8 is a graph of the relationship between breakdown voltage and channel depth under various conditions, FIGURE 9 is a graph (not to scale) illustrating the changes of voltage with time at discs 22 and 25 and sheet 30 in FIGURE 6, FIGURE 10 is a graph illustrating changes of voltage with time at discs 10, 11 and 17 in FIGURE 6, and FIGURE 11 is a sectional diagram of a self-trigger switch.

Figure 1:
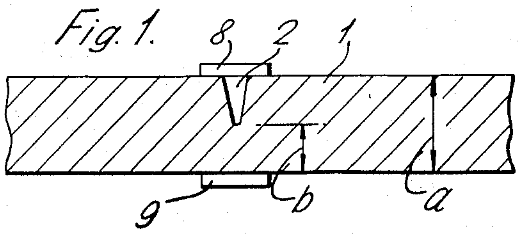
FIGURE 1 is a diagrammatic section of a switch having a single channel.

In FIGURE 1 a plastic dielectric sheet 1 of thickness "$a$" contains a channel 2 made by stabbing the sheet with a needle. The channel is straight and terminates at a distance "$b$" from the lower edge of the sheet. Positive and negative electrodes 8 and 9 cover the region of the channel and extend only a short distance outside this.

Figure 2:
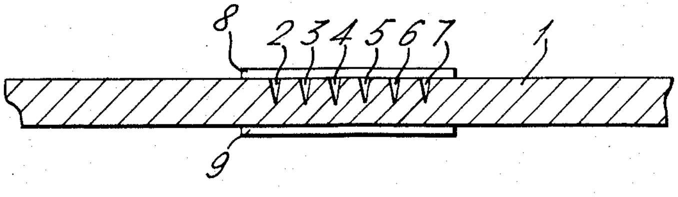
FIGURE 2 is a section of a switch having a plurality of channels.
Figure 3:
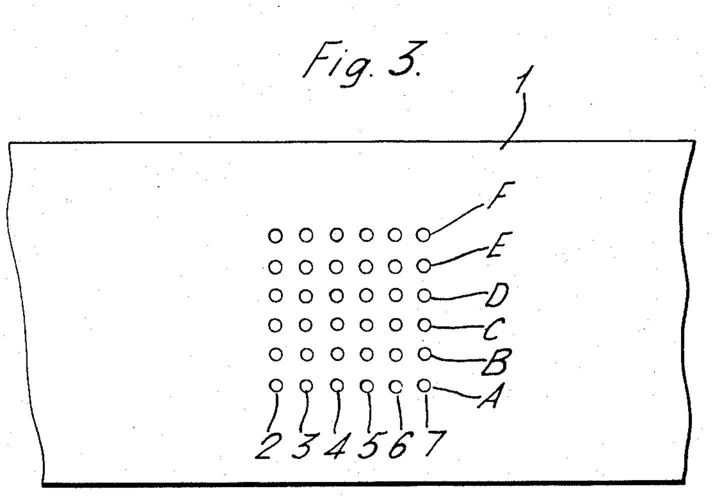
FIGURE 3 is a plan of the dielectric material of FIGURE 2.

In FIGURES 2 and 3 a plurality of holes forming a regular pattern, each channel identifiable by co-ordinates 2 to 7 and A to F, is formed in sheet 1 by stabbing a plastic dielectric to substantially the same depth. The stabbing may conveniently be carried out in a single operation by means of a pad in which are mounted the required number of needles. The channels have substantially the same sizes and depths.

In FIGURE 4 sheet 1 contains a plurality of channels 2. Sheet 1 is conveniently a sheet of polyethylene. Copper conductors 8 and 9 have copper discs 10 and 11 soldered to them. Polyethylene sheets 12 and 14 have holes 15 and 16 to accommodate the discs 10 and 11 respectively, the sheets having the same thickness as the discs. A sheet 13 of polyethylene has the same cross-section as sheet 1. When assembled, the copper and polyethylene sheets form a strip transmission line and the discs 10 and 11 are in contact with sheet 1 and located on each side of the region containing the plurality of channels 2.

In FIGURE 5 copper sheets 8 and 9 have copper discs 10 and 11 soldered to them. Polythene sheets 12 and 14 have holes to accommodate the discs. A polyethylene sheet 1 has a plurality of channels 2 immediately beneath disc 10 and a copper disc 17 and a polyethylene sheet 18 containing a plurality of channels 19. When sheet 8 is charged to a voltage V, sheet 9 being held at zero volts, it can be arranged that disc 17 is held at $V/2$ volts. This can be achieved by a resistor, or by capacitance division if the charging is pulse charging. The electric stress on each plurality of channels 2 and 19 is then $V/2$. The dimensions of the sheets 1 and 18 and the channels can be arranged so that the sheets 1 and 18 withstand $V/2$ but break down at a higher voltage which is less than V. Dropping the volts to zero on disc 17 overvolts sheet 1 and produces breakdown at the tips of the channels 2. This raises the volts on disc 17 to V and overvolts sheet 18, producing breakdown at the tips of channels 19. A conducting path is then established between sheets 8 and 9. It is physically necessary to connect a lead to disc 17 in order to change the volts. The inductance of this lead should be sufficiently high to prevent the establishment of a current path to earth.

In FIGURE 6 copper sheet 8 is tied by a low inductance connection 20 to a copper sheet 21 to which has been soldered a copper disc 22. A polyethylene sheet 23 contains a plurality of channels 24, deeper than channels 2, beneath the disc 22. A copper disc 25 is connected by a wire 26 to copper disc 17 and by a wire 27, of the same length and inductance as wire 26, to a copper disc 28. A sheet 29 of polyethylene separates disc 25 from a copper sheet 30 which is tied by a low inductance lead 31 to copper sheet 9 and by a low inductance lead 32 to a copper sheet 33 having a disc 34 soldered thereto. A polyethylene sheet 35 containing channels 36 which have the same depth as channels 19 and 2. A polyethylene sheet 37 containing channels 38 of the same depth as channels 2 separates disc 28 from a disc 39 which is tied by a low inductance lead 41 to copper sheet 21. The centre assembly formed by discs 22 and 25 and sheets 21 and 30 is, as will appear, a trigger, and the left and right hand assemblies are three electrode switches operated by the trigger.

FIGURE 7 shows a two-unit pulse generator of the kind described in copending application Serial No. 249,873 filed January 7, 1963. It comprises one unit generator including a pair of strip transmission lines formed by copper sheets 8, 9 and 8, 48 (8 being a common sheet), the other unit generator including a pair formed by sheets 40, 47 and 40, 33 (40 being a common sheet) respectively. Polyethylene insulation is provided between the sheets of each pair of lines. Sheets 9 and 47 are separated by a block of polymethylmethacrylate 42 and are connected together at one end by a copper sheet 43, sheets 9, 47 and 43 conveniently being formed by a single sheet of copper. Sheet 43 forms a series connection between the two unit generators, the output being taken from between the ends of sheets 33 and 48 as shown.

Sheets 8 and 40 are interconnected by a copper sheet 21, and sheets 9 and 47 by a copper sheet 30. Sandwiched between sheets 21 and 30, to form a trigger switch embodying the present invention are, starting from sheet 30, a polythene sheet 29, a copper sheet 45 on which rests a copper disc 25, a polythene sheet 23 having a plurality of blind transverse holes 24 in the region of the disc, and a second copper disc 22. Leads 26 and 27 are taken from disc 25 to discs 17 and 28 (not visible) respectively, located between sheets 8 and 9, and 40 and 47 respectively. Discs 17 and 28 are the intermediate electrodes of two three-electrode switches embodying the present invention. It will be seen that the switching arrangement corresponds electrically to that of FIGURE 6, and corresponding numerals refer. Pulse-charging connections 44 and 46 are taken from sheet 21 and sheet 33 respectively to a capacitor 56 which is charged by a Cockcroft-Walton generator (not shown) and discharged into the pulse generator by lowering the sphere 50 to form the centre electrode of a sparkgap whose other two electrodes are shown as 51 and 52. A charging connection 50 having a high inductance in the time-scale of the generator output pulse but a low inductance in the timescale of the charging pulse is made between sheets 9 and 48.

In FIGURE 8 curves A, B and C were obtained by using a polyethylene sheet of thickness 0.06″. Each sheet was stabbed by 50 needles to produce 50 channels of substantially the same size and depth, and the depth of stabs was varied from sheet to sheet. Copper discs of radius sufficient to cover the channeled area were placed on each side of the sheet. To these discs there were applied voltages sufficient to produce breakdown of the polyethylene.

Curves A, B and C were obtained with the application of a positive voltage to the stabbed side of the polyethylene sheet, and curve D was obtained when a negative voltage was applied to the stabbed side of the polyethylene sheet. It can be seen that the same sheet of polyethylene can be used as a switch to operate at one of two voltages, and this allows the simple production of high or low voltage switches.

Curve A was obtained with D.C., curves B and D with the application of a pulse having a rise time of 0.5 $\mu$sec. and curve C with the application of a pulse of rise time 10 m$\mu$sec. Curves for other conditions can be obtained in a similar manner. The dimensions for a switch for operation at a certain voltage can therefore be readily ascertained.

With a single channel the standard deviation in voltage at which the switch operates was about 6% but this could be reduced to about 2% by using 30 or more channels.

In FIGURE 9 curve A represents a rising waveform V applied to disc 22 (FIGURE 6), curve B represents the waveform of the volts ($V_2$) on disc 25, the volts on disc 25 being half those on disc 22. The volt on sheet 30 were kept zero. The depth of the channels 24 was such that overvolting occurred when $V_1-V_2$ was 70 kv. The time taken to reach this figure was 1.5 $\mu$sec. with the equipment used in this instance.

When the overvolting occurs there is established a conducting path between disc 22 and disc 25 and the volts on disc 25 rise sharply in about 1 m$\mu$sec. to the pulse voltage on disc 22, that is, to a little over 140 kv.

In FIGURE 10 curve C represents the rising waveform applied to disc 10 (FIGURE 6). This waveform is identical with that applied to disc 22. Curve D represents the waveform of the volts on disc 17, and the volts are kept at a value half those on disc 10. The depth of the channels 19 is less than for channels 24 and hence overvolting and breakdown do not take place at 70 kv. potential difference. When the volts on disc 25 rise to full pulse voltage (curve B FIGURE 9) the volts on disc 17 rise also because of the inductive wire connection 26. The potential difference between disc 17 and disc 11 therefore rises rapidly and overvolting and breakdown of the polyethylene sheet 18 take place in a time less than 1 m$\mu$sec. The depth of channels 19 is such that in this instance breakdown occurs at about 90 to 100 kv., this requiring about 0.2 m$\mu$sec. from the breakdown of the sheet 23 between discs 22 and 25.

At this instant in time there is a conducting path disc 22→disc 25→lead 26→disc 17→disc 11 but a negligible current flows because of the inductance of the lead 26.

The volts on disc 17 are pulled down to zero by virtue of the breakdown between disc 17 and disc 11 and the full pulse voltage is applied across sheet 1 producing breakdown with consequent establishment of a conducting path between disc 10 and disc 11.

Similar considerations apply to the assembly constituted by discs 28, 34 and 39 and their associated polyethylene sheets and copper sheets.

The time error between the operation of the two three disc switch assemblies at the right and right sides of FIGURE 6 can be kept to less than $10^{-9}$ sec. by simply ensuring that leads 26 and 27 have the same characteristics and by ensuring that there is no delay between the establishment of the volts on the main copper sheets 8, 21 and 40, and 9, 30 and 33.

It can be seen that a number of switches can be operated with close simultaneity by a single trigger.

Returning to FIGURE 7, the operation of the system can now be readily understood. On breakdown of the gap 51, 52, 53, a charging waveform is applied via connections 44 and 46 until the gap between discs 25 and 22 in a trigger switch becomes overvolted and breaks down. Copper sheet 45 acts as a capacity divider to maintain the volts on disc 25 at the required fraction of the charging voltage. Upon breakdown, the voltage change on disc 25 is transmitted to discs 17 and 28, which act to short-circuit substantially simultaneously the non-output ends of sheets 48 and 9, and 40 and 33 respectively, and to generate an output pulse between the output ends of sheets 33 and 48.

In FIGURE 11 sheets 8 and 9 form a strip transmission line which extends in a direction normal to the plane of the paper. A metallic dome 53 is in electrical contact with sheet 9. A polyethylene sheet 54 is the dielectric between sheets 8 and 9 and does not contain any channels. A polyethylene sheet 55 contains channels 2 and 19 as shown. A copper disc 17 rests on sheet 55.

In operation of the switch, sheet 8 is held at zero volts and sheet 9 charged to —V, no potential difference being created between disc 17 and sheet 8. A positive trigger pulse is applied to disc 17 just sufficient to overvolt the gap including channels 19. As discussed with respect to FIGURE 8 this will not cause breakdown of the gap including channels 2. The volts on the disc 17 are however rapidly carried to —V because of the gap breakdown and this puts a positive voltage of V across the gap including channels 2 in a direction towards disc 17. A conducting path is then established, the path being sheet 8→ disc 17→ dome 53→ sheet 9, and the transmission line is discharged.

It will be appreciated that a great variety of switches can be designed making use of the invention, the flexibility in design provided by the invention being very great.

I claim:

1. A switch for establishing a conducting path between two electrodes and comprising a pair of spaced electrodes, a sheet of non-porous dielectric insulating material sandwiched between said spaced electrodes, said sheet being provided with a plurality of blind channels having substantially the same dimensions and extending from one surface of said sheet towards the other surface thereof, said channels terminating at a predetermined distance from said other surface to produce enhanced electrical stress in said material at the blind ends of said channels when a voltage is applied between the electrodes.

2. A switch as claimed in claim 1 wherein said dielectric material is polyethylene and said channels taper towards their blind ends and are air-filled.

3. A switch as claimed in claim 1 comprising an intermediate electrode located between said two electrodes and sheets of solid dielectric insulating material sandwiched between said intermediate electrode and each of said two electrodes, each said sheets being provided with a plurality of blind channels, the channels in one sheet extending from the surface of said sheet adjacent one said electrode towards the surface of said sheet adjacent the intermediate electrode, and the channels in the other sheet extending from the surface of said sheet adjacent the intermediate electrode towards the surface of said sheet adjacent the other said electrode, the channels in each sheet having substantially the same dimensions and penetrating the sheet to a predetermined depth, and a connection to said intermediate electrode for applying a triggering voltage to cause breakdown of one of said dielectric sheets.

References Cited by the Examiner

UNITED STATES PATENTS

| | | | |
|---|---|---|---|
| 1,155,415 | 10/1915 | Greene | 313—243 |
| 2,295,379 | 9/1942 | Beck et al. | 313—268 |
| 2,936,390 | 5/1960 | Melhart | 313—306 |
| 3,046,436 | 7/1962 | Cavalconte | 313—268 |
| 3,149,263 | 9/1964 | Rabus | 315—36 X |

JOHN W. HUCKERT, *Primary Examiner.*

A. J. JAMES, *Assistant Examiner.*